July 1, 1947.  W. D. HERSHBERGER  2,423,383
ABSORPTIVE GAS MICROWAVE MEASURING SYSTEM
Original Filed June 15, 1944
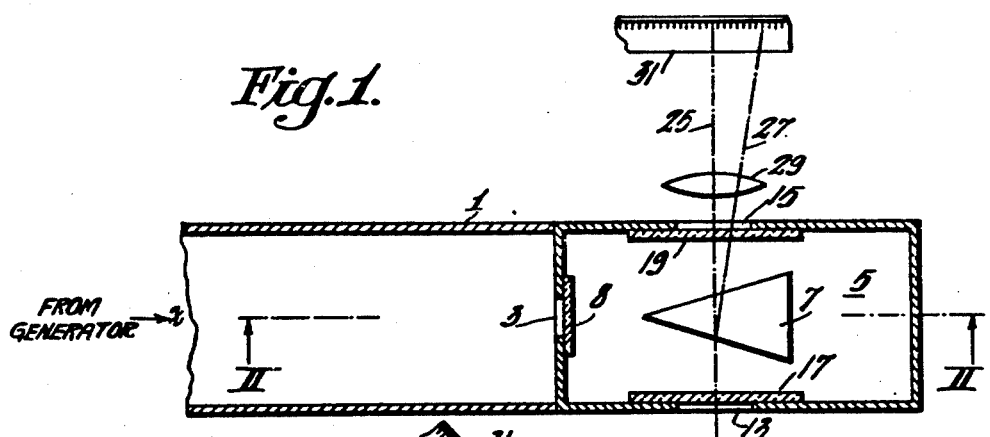
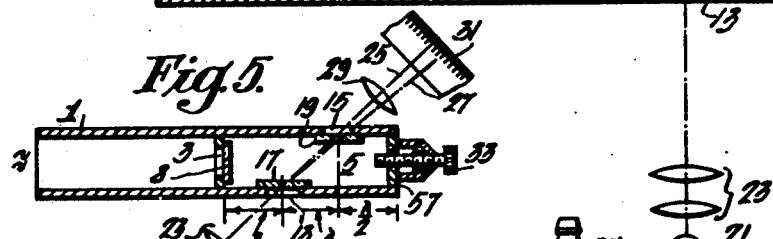
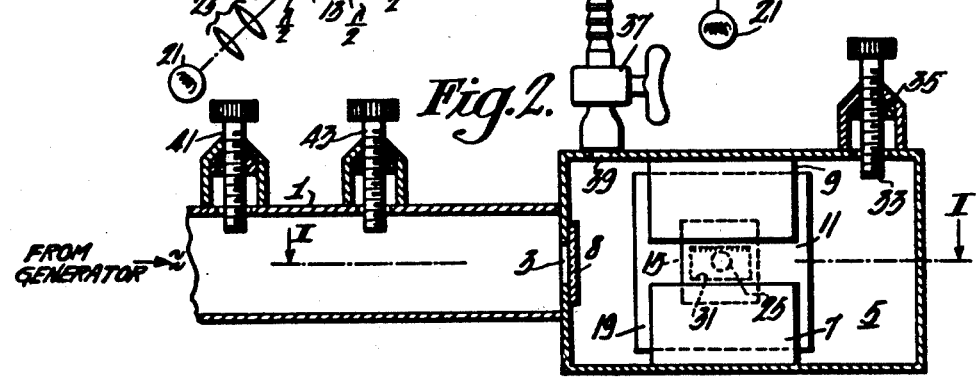
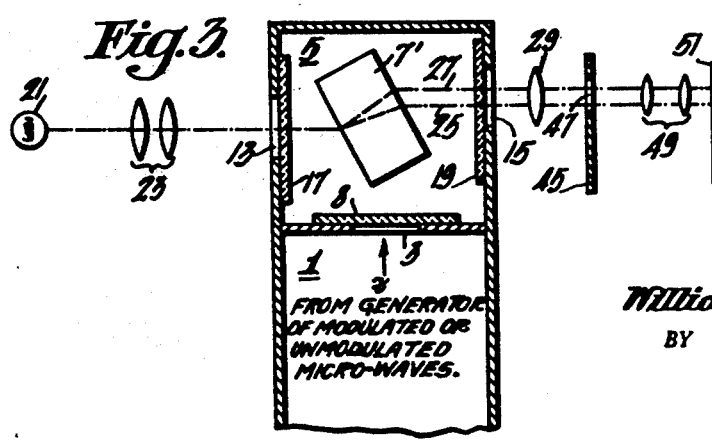
INVENTOR.
William D. Hershberger
BY
ATTORNEY Patented July 1, 1947

2,423,383

UNITED STATES PATENT OFFICE 2,423,383

ABSORPTIVE GAS MICROWAVE MEASURING SYSTEM

William D. Hershberger, Princeton, N. J., assignor to Radio Corporation of America, a corporation of Delaware Original application June 15, 1944, Serial No. 540,428. Divided and this application February 13, 1945, Serial No. 577,709

6 Claims. (Cl. 171—95)

This application is a division of my copending application Ser. No. 540,428, filed June 15, 1944, entitled "Light valve," and assigned to the same assignee as the instant application.

This invention relates generally to microwave transmission and more particularly to improved methods of and means for controlling the deflection of a light beam by varying the refractive index of a microwave absorptive gas interposed in the path of the light beam.

The invention utilizes the characteristics of some gases which are substantially perfect dielectrics at most radio frequencies but which absorb considerable energy at certain other predetermined microwave frequencies. For example, in an article by Cleeton and Williams in Physical Review 45, 234 (1934), observations on microwave absorption in ammonia gas indicated that radiation having a wavelength of 1.25 centimeters will lose approximately 63 percent of its initial energy upon passing through 1.1 meters of ammonia gas in a non-metallic container at atmospheric pressure. It was noted further that the absorption frequency band is relatively wide since the absorption coefficient falls to approximately one-half of its maximum value at wavelengths of 1 centimeter and 1.5 centimeters. The observations described in the article identified heretofore were inspired by earlier general theoretical work on the energy levels of the ammonia molecule together with observations on the infra-red spectrum of this gas, but in all such prior experiments no attempt was made to determine, explain or utilize the effect upon the gas of the microwave absorption by said gas.

The instant invention is related to the invention described in applicant's copending application Ser. No. 537,960, filed May 29, 1944, wherein the change in pressure of a microwave absorptive gas in response to microwave irradiation is utilized to provide a novel method of and means for measuring microwave energy as a function of the change, or rate of change, of the pressure of said gas.

The present invention utilizes the variation in the refractive index of a microwave absorptive gas in response to pressure changes therein due to microwave irradiation, to provide a novel and efficient light valve. In effect, the invention comprises a novel light prism, the refractive index of which may be directly controlled as a function of microwave irradiation.

It is believed that the variation in refractive index of a microwave absorptive gas subjected to predetermined microwave irradiation is due to heating of the gas by molecular resonance effects incidental to the excitation of the energy levels of the gas molecules. It is known that the microwave energy absorption in the gas increases as a function of the gas pressure. The variation in refractive index of a light valve of the microwave absorptive gas type also is increased as a function of the intensity or concentration of the microwave irradiation of said gas.

A preferred embodiment of the invention comprises a cavity resonator having a microwave permeable window opening into a waveguide which introduces microwave energy into the resonator. The resonator, if desired, may include conductive projecting members which concentrate the resultant electric field within a predetermined region of the interior of the cavity resonator. Microwave absorptive gas, such, for example, as ammonia, is introduced into the cavity resonator at the desired pressure to provide the required sensitivity. Light permeable windows disposed on opposite faces of the cavity resonator adjacent the conductive projecting elements permit the focusing of a light beam through the cavity resonator between the conductive projecting elements whereby the light beam penetrates the gas through a region subjected to the maximum electric field within the cavity resonator. If the conductive projecting elements are triangular in cross-section or rectangular with faces other than parallel to the light permeable windows, the microwave field between the conductive elements provides a region having a relatively abrupt change in refractive index which will deflect or refract a light beam directed therethrough.

Any well known means may be employed for introducing and venting the desired microwave absorptive gas in the cavity resonator. Also, if desired, the cavity resonator may be tuned to the operating microwave frequency by any conventional tuning screw, tuning plug or other known means. Similarly, by means of additional adjustable reactive elements such as tuning screws or tuning plugs disposed in the waveguide adjacent the window into the cavity resonator, the microwave resonator impedance may be matched to the characteristic impedance of the waveguide to minimize wave reflections from the resonator.

As will be explained in greater detail hereinafter, a microwave responsive light valve employing the novel features of the invention may be utilized for refracting or deflecting a light beam for indicating directly on an adjacent indicator scale the microwave energy absorbed in the microwave absorptive gas chamber, thereby providing an extremely convenient, accurate, and flexible microwave wattmeter. Also, the invention may be employed for oscillographic or sound film recording purposes wherein the light valve is interposed between a light source and a screen or moving photographic film. In this modification of the invention the deflection or refraction of the light beam may be employed in cooperation with a fixed aperture device to vary the amount of light or the position of the light beam which is focused upon the oscillographic screen or moving photographic film.

Among the objects of the invention are to provide an improved method of and means for measuring microwave energy. Another object of the invention is to provide a novel method of and means for controlling the light refractive index of a microwave absorptive gas. An additional object of the invention is to provide an improved method of and means for controlling the refraction or deflection of a light beam in response to the magnitude of microwave irradiation of a microwave absorptive gas.

Another object of the invention is to provide an improved method of and means for controlling a light beam. A further object of the invention is to provide an improved light valve which may be employed in cooperation with a fixed aperture device to provide convenient and efficient means for modulating a light beam in response to the modulation of a source of microwaves. A further object of the invention is to provide an improved microwave wattmeter. A still further object of the invention is to provide an improved method of and means for recording sound on a moving motion picture film comprising a microwave responsive light valve, means for focusing a light beam through said light valve and through a fixed aperture device to said film, and means for varying the refractive index of said light valve in response to modulated microwaves characteristic of the sound to be recorded upon said film.

The invention will be described in greater detail by reference to the accompanying drawing of which Figure 1 is a schematic plan cross-sectional view, taken along the section line I, I of one embodiment of the invention, Figure 2 is a cross-sectional elevational view taken along the section line II, II of said embodiment of the invention, Figure 3 is a schematic plan cross-sectional view of a second embodiment of the invention adapted to the recording of sound on film, Figure 4 is a fragmentary view of a fixed aperture plate and a movable film forming a portion of the system of Figure 3, and Figure 5 is a schematic plan cross-sectional view of a third embodiment of the invention. Similar reference characters are applied to similar elements throughout the drawing.

Either tuned or untuned cavity resonators, into which predetermined microwave energy absorbent gases may be introduced at predetermined pressures, may be employed to confine the active element to provide variations in the refractive index of the light valve. For the purpose of illustration, it will be assumed that the cavity resonator is filled with ammonia gas. However, various other types of gases which absorb energy in the microwave frequency range will be listed hereinafter.

In the tuned cavity resonator type of light valve illustrated in Figs. 1, 2 and 3, the microwave field, to which the ammonia gas is subjected, conforms to the customary modes found in relatively sharply tuned cavity resonators, and is of high intensity since practically all of the microwave energy is absorbed within the resonator. The cavity resonator may be tuned to the desired applied frequency by means of a tuning plunger, or tuning screws, of any type well known in the art. The tuning adjustments may be made through gas-tight gaskets in the cavity resonator wall, or by means of Sylphon joints common to conventional vacuum systems. Similarly, the various microwave or light permeable windows in the cavity resonator walls may be made gas-tight by conventional rubber gaskets, held under suitable pressure. Also, metal-to-glass seals such as are employed in the fabrication of vacuum tubes used in radio broadcast equipment may be utilized.

Reactive tuning elements coupled to the waveguide intermediate the source of microwave energy and the cavity resonator may be employed to provide proper matching of the resonator to the transmission system surge impedance in order substantially to prevent wave reflections and thereby to insure that most of the transmitted energy is confined to the cavity resonator and absorbed by the gas therein.

An untuned cavity resonator of the type illustrated in Fig. 3 is proportioned so that, in view of the Q of the device—which is determined by the resonator wall losses and the losses in the ammonia gas—the resonant modes are so closely spaced as to overlap. This condition may be achieved by selecting the volume of the resonator to be larger than some minimum value in view of the expected Q of the resonator.

The number of resonator modes $\Delta n$ lying in the frequency range $\Delta f$, which is determined in turn by the value of Q in the relation $$\frac{\Delta f}{f} = \frac{1}{Q}$$

is approximately (1) $$\Delta n = \frac{8\pi V_0}{\lambda^3 Q}$$

where $V_0$ is the volume of the resonator and $\lambda_0$ is the wavelength of the microwave energy.

The variation in temperature $\Delta T$ of the microwave absorbent gas within the cavity resonator may be calculated from the gass pressure $\Delta p$ by the relation (2) $$\frac{\Delta T}{T} = \frac{\Delta p}{p}$$

where $p$ is the static pressure and T is the absolute temperature.

Hence, in accordance with known relations, it will be understood that the variation in the refractive index of the enclosed gas will be a function of the variation in pressure of the gas in response to absorbed microwave energy. Since the refractive index of the gas also will be controlled indirectly by low losses in the cavity resonator, and by the heat transferred from the gas to the cavity resonator walls, it may be found to be desirable to thermally insulate or to control, in any known manner, the temperature of the resonator walls.

The energy directly absorbed by the gas from the microwave transmission system provides a substantially rapid increase in gas temperature, and hence, in the refractive index of the gas, since the gas has a relatively low heat capacity and a relatively high temperature coefficient of expansion. These features, therefore, will provide relatively high variations in the refractive index of the enclosed gas in response to modulated microwave energy irradiating said gas. Unless the cavity resonator walls are thermally insulated from the enclosed gas, or are maintained at substantially constant temperature, by means of an air blast or other known expedient, the heat transfer between the cavity walls and the enclosed gas may provide relatively slow, protracted pressure variations in the gas which will be reflected as undesired variations in the refractive index thereof.

The ratio of the energy dissipated in the gas proper to the energy dissipated in the resonator walls is a function of the initial pressure of the gas confined within the resonator. Also, it depends upon proper design of the cavity itself and its input iris.

It should be understood that the cavity resonator, when properly matched to the waveguide system, performs substantially as a perfectly matched load which absorbs all of the microwave energy introduced thereto. Since, as explained heretofore, conductive elements connected to the inner walls of the cavity resonator may be employed to concentrate the electric field within the resonator in a predetermined desired region, the overall efficiency of the device may be adjusted to a relatively high value. As will be explained in greater detail hereinafter, the resultant microwave absorptive gas-tight light valve may be designed to provide single or multiple angular or lateral deflections of an applied light beam, which may be utilized in any known manner to provide desired indications of the variations in the refractive index of the gas.

Referring to Figure 1 of the drawings, a conventional rectangular waveguide 1 opens, through an aperture 3, into a cavity resonator 5. A gastight, microwave-permeable window 8 covers the aperture 3. An inwardly projecting conductive element 7, having triangular cross-section, is fastened to the lower inner wide face of the cavity resonator 5. A similar inwardly-projecting, triangular cross-sectional member 9, shown in Fig. 2, cooperates with the lower projecting element 7 to form a gap 11 providing a region having a concentrated electric field in response to microwave energy introduced into the cavity resonator from the waveguide.

Apertures 13, 15, in opposite side faces of the cavity resonator 5, are covered by gas-tight, light-permeable windows 17, 19, respectively. A light source 21, which may include a condensing lens system 23, directs a light beam, indicated by the dash lines 25 or 27, through the windows in the cavity resonator 5, transversely of the gap 11 between the inwardly projecting conductive elements 7 and 9.

Microwave energy from a microwave generator (not shown) is applied to the cavity resonator 5 through the waveguide 1 and the microwave-permeable window 8 to establish a microwave field within the cavity resonator which is substantially concentrated in the gap 11 between the conductive elements 7 and 9. The cavity resonator 5 encloses a microwave absorptive gas, such, for example, as ammonia. The gas may be maintained at any desired pressure to provide the desired sensitivity. The concentrated microwave field established between the inwardly projecting elements 7 and 9 provides a region of increased gas pressure in the gap 11 due to heating of the gas from the absorbed microwave energy incident to the concentration of the electric field in said gap. The increased gas pressure in the gap 11 results in a corresponding variation in the light refractive index of the ammonia gas in said gap. Hence, the boundary region between the gas in the gap 11 and the gas in the remainder of the cavity resonator 5 effectively comprises a gas prism of which the refractive index may be varied as a function of the magnitude of the microwave energy introduced into the cavity resonator.

Since the refractive index of the prism may be varied as a function of the applied microwave energy, the light beam directed through the gas prism will be deflected, for example, as shown in the dash lines 25 or 27. If desired, a projection lens 29, disposed adjacent the output window 19, may be employed to focus the light beams 25 or 27 upon a suitable calibrated scale 31, whereby the microwave power absorbed in the cavity resonator 5 may be indicated directly.

Referring to Fig. 2, the cavity resonator 5 may be tuned to resonate to the applied microwave energy by means of a conventional tuning screw 33, which preferably includes a gas-tight rubber gasket 35. The ammonia gas may be introduced into the cavity resonator 5 through a conventional gas valve 37, disposed adjacent a gas intake aperture 39 in one of the walls of the cavity resonator 5. In order to match effectively the impedance of the cavity resonator 5 to the surge impedance of the waveguide 1 to prevent wave reflections from the cavity resonator to the microwave energy source, tuning screws 41, 43 or other conventional adjustable reactive means, may be disposed on the waveguide walls adjacent to the microwave permeable window 8.

It should be understood that while the device disclosed in Figs. 1 and 2 is described as a wattmeter for the direct measurement of microwave energy, that a similar device may be employed to record the modulation characteristics of microwave energy upon a suitable moving screen or photographic film for oscillographic or related purposes.

Referring to Figs. 3 and 4, a light valve is illustrated which provides a parallel displacement of a light beam in response to variations in the magnitude of microwave energy introduced into a gas-filled cavity resonator. In this second embodiment of the invention, the structure may be identical to that described heretofore in Figs. 1 and 2, with the exception that the inwardly projecting conducting elements disposed within the cavity resonator are substantially rectangular in cross-section, and are disposed in a manner whereby their side faces form acute angles with the light permeable windows 17, 19. A light beam, derived from the light source 21 and condenser lens system 23, is introduced into the cavity resonator 5 through the input light window 17, to provide parallel displacement of the light beams 25 or 27 in response to different magnitudes of microwave energy introduced into the cavity resonator.

If desired, the parallel displaced light beams 25 or 27, which pass through the output light window 19, may be focused by means of the projection lens 29 upon an apertured mask 45. Light which penetrates the aperture 47 in the apertured mask 45 may, if desired, be focused by means of a supplementary projection lens system 49 upon the desired area of a moving photographic film 51.

The device thus described may be employed for the purpose of recording signal modulation upon a moving photographic film such, for example, as in motion picture sound recording.

For this purpose, the microwave energy introduced into the waveguide 1 is amplitude-modulated in any known manner by means of the desired modulation signals to provide a light beam of variable area, which may be recorded upon the moving film 51. The dashed circles 53, 55, adjacent the aperture 47 in the apertured plate 45, indicate the manner in which the light beam derived from the cavity resonator light valve is masked by the masking plate 45. It should be understood that, alternatively, the device described in Fig. 3 may be used for the direct measurement of microwave power by focusing the output light beam upon a suitably calibrated scale, as described heretofore in Figs. 1 and 2.

Referring to Figure 5, a third embodiment of the invention is illustrated wherein the inwardly-projecting conductive elements described heretofore are omitted, and wherein the light permeable windows 17, 19 are disposed at current nodes in opposite walls of the cavity resonator 5. In this third embodiment of the invention the cavity resonator 5 comprises a section of the waveguide 1, having an effective length of three half-wavelengths. The tuning screw 33 may be located on one of the side walls of the cavity resonator 5 or, if desired, may be disposed in the end wall 57 closing the end of the waveguide 1 at a point three half-wavelengths from the input aperture 3 and microwave permeable window 8.

The light permeable windows 17, 19 are disposed in the narrow side walls of the cavity resonator 5, at points separated one-half wavelength from either end of the cavity resonator, and thus, one-half wavelength from each other.

Thus, a light beam, derived from the light source 21 and condensing lens system 23, is directed diagonally through the gas prism formed by the gas-filled cavity resonator 5, and may be focused by the projection lens 29 upon a calibrated scale 31, for the direct measurement of the magnitude of the microwave energy introduced into the cavity resonator.

Alternately, the latter device may be employed, as described heretofore in Figs. 3 and 4, for the recording of light variations upon a moving photographic film.

It should be understood that the sensitivity of the embodiment of the invention illustrated in Fig. 5 will be less than that of the embodiments described in Figs. 1, 2, and 3, since the electric field within the cavity resonator will not be concentrated in the region through which the light beam is directed. However, the embodiment shown in Fig. 5 provides a convenient construction, especially in instances wherein conventional 1.25 centimeter waveguides are employed, since the physical size of such waveguides seriously limits the use of internal structural elements. Furthermore, the embodiment of the invention illustrated in Fig. 5 has the advantage that the light permeable windows 17, 19 are disposed at points of low magnetic field intensity, thereby minimizing microwave energy leakage from the cavity resonator 5.

It should be understood that the impedance of the cavity resonator 5 may be matched to the surge impedance of the waveguide 1 in the same manner as described heretofore in Figs. 1, 2 and 3, in order to minimize wave reflections from the cavity resonator to the microwave generator.

Various other microwave absorptive gases have been tested and found to be quite satisfactory for microwave power measurements in apparatus of the type described heretofore. The following table discloses the microwave frequencies at which some of these various gases have been found to absorb considerable microwave energy as indicated by the absorption coefficients which have been measured:

| Gas | Wavelength | Power Absorption Coefficient per cm. |
|---|---|---|
| | Cm. | |
| Ethyl Chloride | 1.25 | $25 \times 10^{-4}$ |
| Ethylene Oxide | 1.25 | $35 \times 10^{-4}$ |
| Freon 22 | 1.25 | $17 \times 10^{-4}$ |
| Monoethylamine | 1.25 | $6.7 \times 10^{-4}$ |
| Ammonia | 1.25 | $84 \times 10^{-4}$ |
| | 3.3 | $16 \times 10^{-4}$ |

Thus the invention described comprises several embodiments of an improved light valve which may be employed for the measurement or indication of microwave energy or signal modulation of said energy. The devices disclosed provide an extremely convenient, accurate, and sensitive means for measuring or indicating microwave energy in the millimeter and centimeter regions, wherein the invention effectively comprises a gas type prism, the refractive index of which may be varied as a function of the magnitude applied microwave energy.

I claim as my invention:

1. A microwave energy responsive indicator including a microwave resonant chamber for enclosing a microwave energy absorptive gas, means for introducing microwave energy to be measured into said chamber to establish a microwave field in said gas for varying the light refractive properties of said gas, a light beam source, an indicating light target, and means for directing said light beam through said variably refractive gas to impinge upon said target in a manner whereby said beam is refracted as a function of the intensity of said field.

2. A microwave energy responsive indicator including a microwave resonant chamber for enclosing a microwave energy absorptive gas, a microwave permeable window in said chamber, means for introducing microwave energy to be measured through said window into said chamber to establish a microwave field in said gas for varying the light refractive properties of said gas in response to the energy absorbed by said gas, a light beam source, an indicating light target, and means for directing said light beam through said variably refractive gas to impinge upon said target in a manner whereby said beam is refracted as a function of the intensity of said field.

3. A microwave energy responsive indicator including a microwave resonant chamber for enclosing a microwave energy absorptive gas, a microwave permeable window in said chamber, means for introducing microwave energy to be measured through said window into said chamber to establish a microwave field in said gas for varying the light refractive properties of said gas in response to the energy absorbed by said gas, a light beam source, a calibrated light target, and means for directing said light beam through said variably refractive gas to impinge upon said target in a manner whereby said beam is refracted as a function of the voltage induced across said chamber by said field.

4. A microwave energy responsive indicator including a microwave resonant chamber for enclosing a microwave energy absorptive gas, a microwave permeable window in said chamber, a pair of conductive elements extending toward each other from opposite sides of said chamber and forming a gap between adjacent ends thereof, means for introducing microwave energy to be measured through said window into said chamber to establish a microwave field in said gas in said gap for varying the light refractive properties of said gas in said gap in response to the energy absorbed by said gas, a light beam source, an indicating light target, and means for directing said light beam through said variably refractive gas in said gap to impinge upon said target in a manner whereby said beam is refracted as a function of the voltage induced across said gap by said field.

5. Apparatus as described in claim 4 including a lens disposed intermediate said chamber and said target for focusing said refracted light beam on said target.

6. Apparatus as described in claim 3 including reactive means for tuning said chamber to vary the light refractive characteristics of said gas in the path of said light beam through said chamber.

WILLIAM D. HERSHBERGER.

REFERENCES CITED

The following references are of record in the file of this patent:

FOREIGN PATENTS

| Number | Country | Date |
| --- | --- | --- |
| 705,376 | Germany | Apr. 26, 1941 |